2,854,465
Patented Sept. 30, 1958

2,854,465

PROCESS FOR THE MANUFACTURE OF HALO-
GEN-PREGNANES AND DEHALOGENATION
PRODUCTS THEREOF

Albert Wettstein, Georg Anner, Ludwig Ehmann, and
Jean-René Billeter, Basel, and Charles Meystre, Arles-
heim, Switzerland, assignors to Ciba Pharmaceutical
Products Inc., Summit, N. J.

No Drawing. Application February 16, 1956
Serial No. 565,770

Claims priority, application Switzerland
February 18, 1955

14 Claims. (Cl. 260—397.45)

The present invention provides a productive process for the manufacture of 2:4-dihalogen-3:20-diketo-17α-hydroxy-pregnane compounds which contain in the 21-position a free or functionally converted hydroxyl group and in the 11-position, if desired, an oxo or a free or functionally converted hydroxyl group, and of 1:4-dienes or 4-monoenes obtainable from these compounds.

The said compounds are obtained in accordance with the invention by reacting with a halogenating agent a 3:20-diketo-pregnane compound, which contains in the 21-position a free or functionally converted hydroxyl group, in the 17α-position a hydroxyl group esterified with a perhalogenated aliphatic carboxylic acid and in the 11-position, if desired, an oxo group or a free or functionally converted hydroxyl group, or a corresponding 3-enol- or 3-keto-2-halogen- or 3-keto-4-halogen derivative thereof, and, if desired, treating the resulting 2:4-dihalogen-compound with an agent capable of splitting off hydrogen halide and, if desired, with a reducing agent.

In the starting materials the 17α-hydroxyl group is esterified with a perhalogenated, such as a perbrominated, perchlorinated or especially a perfluorinated, aliphatic carboxylic acid, for example, acetic acid, propionic acid or butyric acid. There may be mentioned more especially the 17α-perhalogen-acetates, and principally the 17α-trifluoracetates. The remaining hydroxyl and oxo groups may be present in the form of free or functionally converted hydroxyl or oxo groups, for example, as esterified or etherified hydroxyl groups, as enol ether groups, ketals or the like. In the esterified hydroxyl groups the acid residues may be those of any desired organic or inorganic acids, such as aliphatic, alicyclic, araliphatic or heterocyclic carboxylic acids, thion-carboxylic acids, thiol-carboxylic acids or sulfonic acids, sulfuric acids, hydrohalic acids or phosphoric acids. The ethers and enol ethers may be derived from any desired alcohols, for example, from aliphatic or araliphatic alcohols. In addition to the substituents mentioned above, the starting materials may contain other substituents, for example, in the 9α-position a halogen atom such as a fluorine or chlorine atom and/or in the 18-position a free or functionally converted hydroxyl, oxo or acid group, for example, an esterified or etherified hydroxyl group, an acetalized oxo group or an esterified acid group. The starting materials may be of any desired steric configuration and may belong principally to the allopregnane series, but may also be present as racemates. There may also be used compounds of the so-called nor- and/or homo-series, such as 19-nor- and D-homo-compounds.

The starting materials can be obtained by treating the corresponding 17α-hydroxy-compounds with perhalogenated aliphatic carboxylic acids or derivatives thereof, for example, trihalogenated acetic acids or trihalogen-acetic anhydrides, for example, at room temperature. The reaction may be carried out in the presence of a diluent, such as an organic solvent, for example, an ether or a halogenated hydrocarbon. It is often of advantage to use a catalyst, for example, a base such as a tertiary amine, for example, pyridine or dimethyl aniline.

There are especially suitable for the halogenation chlorine or bromine, but there may also be used N-halogen-imides or -amides, hypohalites such as tertiary butyl hypo halites. The halogenation may be carried out in the presence of a suitable solvent or diluent, for example, acetic acid, methylene chloride, chloroform, acetonitrile, isopropanol, dimethyl-formamide, dimethyl-acetamide or mixtures thereof. The halogenation is advantageously carried out at a temperature within the range of —50 to +50° C. in the presence of a catalyst suitable for halogenation reactions, and more especially hydrogen bromide, and also sulfuric acid or an organic sulfonic acid, for example, para-toluene sulfonic acid.

By working in the manner described above there are in general obtained 2:4-dihalogen-compounds due to the rearrangement of the intermediately formed 2:2- or 4:4-dihalogen-compounds under the influence of the catalyst. In certain cases, especially in the halogenation of 3-keto-2-halogen-derivatives in the presence of a buffer, such as potassium acetate, it is possible to isolate the 2,2'-dihalogen-compounds, which can then be converted by the action of the above-mentioned catalysts into the 2:4-dihalogen-compounds. It is also possible to obtain mixed 2:4-dihalogen-compounds, for example, 2-chloro-4-bromo- or 2-bromo-4-chloro-compounds.

A special characteristic of the 2:4-dihalogen-compounds obtainable by the above process is the great ease with which the 17α-hydroxyl group esterified with the perhalogenated aliphatic carboxylic acid, especially trifluoracetic acid, can be hydrolyzed. This hydrolysis can even be accomplished by the prolonged action of water at room temperature, advantageously in the presence of a weak organic or inorganic base, upon the 2:4-dihalogen-compounds without the halogen atoms in the 2- and 4-positions being attacked. Accordingly, the hitherto difficultly accessible 2:4-dihalogen-3:20-diketo-17α-hydroxy-pregnane compounds which contain in the 11-position an oxo group or a free or functionally converted hydroxyl group and in the 21-position a free or functionally converted hydroxyl group, and which are important for the synthesis of cortisone and hydrocortisone, can be obtained in a simple manner by the present process.

The conversion of the 2:4-dihalogen-compounds into the 1:4-dienes may be effected with an agent capable of splitting off hydrogen halide, such as a tertiary organic base, for example, collidine or dimethylaniline. The splitting off of hydrogen halide may also be carried out indirectly by forming a 3-phenyl-hydrazone, especially 2:4-dinitro-phenyl-hydrazone, or a 3-semicarbazone, and treating the resulting compound with an acid, advantageously pyroracemic acid.

The 2:4-dihalogen compounds can be converted into the 4-monoenes by several methods. As an example of one of these, the 2:4-dihalogen compounds are treated, with an alkali metal iodide, e. g. sodium iodide, in the presence of a suitable solvent, such as acetone. From the resulting Δ⁴-2-iodo-3-ketones the iodine atom can be removed by reduction. Suitable reducing agents are especially chromyl chloride, zinc in the presence of an acid, such as acetic acid, or of an alcohol, such as ethanol, a nickel catalyst, such as Raney nickel, or a tertiary base, such as collidine.

The final products are known and are useful as medicaments. Thus, 1-dehydrocortisone, 1-dehydro-hydrocortisone, 1-dehydro-17α-hydroxy-cortexone, 1-dehydro-9α-fluoro- and 1-dehydro-9α-chloro-hydrocortisone obtainable from the corresponding 2:4-dihalogen-compounds, are distinguished by an increased biological action. The 2:4-dihalogen-pregnane compounds, as stated above, are also valuable intermediate products for the production of medicaments, such as cortisone and hydrocortisone. The intermediate 2:4-dihalogen-3:20-diketo-17α-hydroxy-pregnane and $\Delta^{1:4}$-3,20-diketo-17α-hydroxy-pregnadiene compounds, which are esterified in the 17α-position with a perhalogenated aliphatic carboxylic acid and which contain in the 21-position a free or functionally converted hydroxyl group and in the 11-position, if desired, an oxo group or a free or functionally converted hydroxyl group, are new. Their conversion to useful therapeutic compounds is described above. Specific examples are provided below.

The following examples illustrate the invention:

*Example 1*

55.4 grams of 17α:21-bis-trifluoracetoxy-3:11:20-triketoallopregnane are dissolved in 1000 cc. of chloroform and mixed with 30 grams of hydrogen bromide. While stirring well at room temperature, there are run in rapidly 16.0 grams of bromine diluted with 500 cc. of chloroform. When all the bromine is consumed, a further 16.0 grams of bromine dissolved in 500 cc. of chloroform are added dropwise at room temperature in the course of 2–3 hours. The reaction solution is then washed with ice water, ice cold sodium bicarbonate solution and ice water. The chloroform solution is evaporated, after being dried in vacuo at room temperature, and the residue is washed with ether, whereby 17α:21-bis-trifluoracetoxy-3:11:20-triketo-2:4-dibromallopregnane crystallizes out.

71.2 grams of 17α:21-bis-trifluoracetoxy-3:11:20-triketo-2:4-dibromallopregnane are dissolved in 1000 cc. of collidine and heated for 1–2 hours. The whole is then cooled, 15 cc. of water are added, and the mixture is allowed to stand for 24 hours at room temperature. The reaction mixture is again diluted with water, extracted with ethyl acetate, and the extract is washed with dilute hydrochloric acid and dilute sodium bicarbonate solution. The dried ethyl acetate solution is evaporated in vacuo and the residue is crystallized from a mixture of acetone and ether. There is obtained $\Delta^{1:4}$-17α:21-dihydroxy-3:11:20-triketo-pregnadiene melting at 231–234° C.; λ max. 240 mμ, ε=15800. When the collidine treatment and the addition of ice water is followed immediately by an extraction with ethyl acetate the $\Delta^{1:4}$-17α:21-bis-trifluoracetoxy-3:11:20-triketo-pregnadiene is obtained.

The starting material can be prepared, for example, as follows:

36.2 grams of 17α:21-dihydroxy-3:11:20-triketo-allopregnane are dissolved in 180 cc. of dioxane and 180 cc. of pyridine. The whole is cooled to 0° C. and 60 cc. of trifluoracetic anhydride diluted with 60 cc. of dioxane are added dropwise in the course of 2–3 hours, while stirring and cooling with ice. The reaction mixture is then stirred for a further 10–12 hours at 15–25° C., and then concentrated in vacuo. The partially crystalline residue is taken up in ether and the ethereal extract is washed in turn with ice water, ice-cold 0.1 N-hydrochloric acid, ice water, ice-cold sodium bicarbonate solution of 2.5 percent strength and finally with ice water. The purified ethereal extract is dried and concentrated, and the residue is mixed with methanol, whereupon 17α:21-bis-trifluoracetoxy-3:11:20-triketo-allopregnane crystallizes out.

*Example 2*

16.0 grams of bromine are dissolved in 300 cc. of dimethyl-formamide and introduced, while stirring, at room temperature into a solution of 50.0 grams of 17α-trifluoracetoxy-21-acetoxy-3:11:20-triketo-allopregnane and 40 grams of para-toluene sulfonic acid in 500 cc. of dimethyl formamide. When all the bromine is consumed, a further 16.0 grams of bromine diluted with 300 cc. of dimethyl-formamide are introduced dropwise in the course of 2–4 hours at room temperature. There are then added 15 cc. of water and the reaction mixture is allowed to stand for 24 hours at room temperature. By the further addition of water the 17α-hydroxy-21-acetoxy-3:11:20-triketo-2:4-dibromallopregnane is precipitated. The reaction product is filtered off with suction, washed with water and dried.

65.8 grams of 17α-hydroxy-21-acetoxy-3:11:20-triketo-2:4-dibromallopregnane are heated for several hours with 1000 cc. of 2:4:6-trimethyl-pyridine. The reaction mixture is then concentrated in vacuo and the residue is extracted with ethyl acetate. The ethyl acetate extract is washed with dilute hydrochloric acid and dilute sodium bicarbonate solution, dried in vacuo, evaporated and a mixture of ether and acetone is added whereupon $\Delta^{1:4}$-17α-hydroxy-21-acetoxy-3:11:20-triketo-allopregnadiene crystallizes out. It melts at 224–230° C.; λ max. 240 mμ, ε=14800.

The starting material used above can be prepared, for example, as follows:

40.4 grams of 17α-hydroxy-21-acetoxy-3:11:20-triketo-allopregnane are dissolved in 250 cc. of pyridine and mixed dropwise, while stirring, at 0° C. with 45 grams of trifluoracetic anhydride diluted with 45 cc. of dioxane. The reaction mixture is stirred for a further 10–12 hours at 15–25° C. After concentrating the mixture in vacuo, the residue is dissolved in ether, the ethereal solution is washed in turn with ice water, ice-cold 0.1 N-hydrochloric acid, and ice-cold sodium bicarbonate solution of 2.5 percent strength and ice water, then dried and concentrated, and the residue is mixed with methanol, whereupon 17α-trifluoracetoxy-21-acetoxy-3:11:20-triketo-allopregnane crystallizes out. It melts at 179–182° C.

*Example 3*

65.2 grams of 11β:17α:21-tris-trifluoracetoxy-3:20-diketo-allopregnane and 40 grams of para-toluene sulfonic acid are dissolved in 500 cc. of dimethyl-formamide. A solution of 32.0 cc. of bromine in 1000 cc. of dimethyl-formamide is added dropwise, while stirring, at room temperature in the course of 4–5 hours. 11β:17α:21-tris-trifluoracetoxy-3:20-diketo-2:4-dibromallopregnane is then precipitated from the reaction mixture by successive additions of water. The product is filtered off with suction, washed with ice water and dried in vacuo.

81.0 grams of 11β:17α:21-tris-trifluoracetoxy-3:20-diketo-2:4-dibrom-allopregnane are dissolved in 1000 cc. of collidine and heated for 1–2 hours. After cooling the mixture, there are added 20 cc. of water, and the whole is heated for several hours on a boiling water bath and evaporated in vacuo. The residue is extracted with ether, and the ethereal extract is washed with dilute hydrochloric acid and a dilute solution of sodium bicarbonate. The dried ethereal solution is evaporated and the residue is crystallized from methanol. The resulting $\Delta^{1,4}$-11β:17α:21-trihydroxy-3:20-diketo-pregnadiene melts at 238–241° C.; λ max. 244 mμ, ε=15100.

The starting material may be prepared, for example, as follows:

36.4 grams of 11β:17α:21-trihydroxy-3:20-diketo-allopregnane, dissolved in 250 cc. of dimethyl aniline, are mixed dropwise at 0° C., while stirring, in the course of 2 hours with 60 grams of trifluoracetic anhydride diluted with 60 cc. of dioxane. The whole is stirred for 10–12 hours at 15–25° C. and then concentrated in vacuo. The residue is taken up in ether and the ethereal extract is washed in turn with ice-cold water, 0.1 N-hydrochloric acid and sodium bicarbonate solution of 2.5 percent strength. After being purified and then dried, the ethereal solution is evaporated, and the residue is taken up in methanol, after which 11β:17α:21-tristrifluoracetoxy-3:20-diketo-allopregnane crystallizes out in fine needles.

Example 4

59.8 grams of 11β:17α-bis-trifluoracetoxy-21-acetoxy-3:20-diketo-allopregnane and 30 grams of hydrogen bromide are dissolved in 1500 cc. of methylene chloride, and mixed, while stirring, in the course of 5–6 hours at room temperature with 33 grams of bromine dissolved in 1000 cc. of methylene chloride. The reaction solution is washed with ice-cold sodium bicarbonate solution and ice water. The methylene chloride solution is dried and evaporated in vacuo, whereby 11β:17α-bis-trifluoracetoxy - 21 - acetoxy - 3:20 - diketo - 2:4 - dibrom - allopregnane crystallizes out.

75.6 grams of 11β:17α-bis-trifluoracetoxy-21-acetoxy-3:20-diketo-2:4-dibrom-allopregnane are dissolved in 1000 cc. of pyridine and after the addition of 10 cc. of water the whole is allowed to stand at room temperature for 24 hours. The reaction product is precipitated out with water, taken up in ether, and the ethereal solution is washed with ice cold dilute hydrochloric acid. The dried ethereal solution is concentrated, whereupon 17α-hydroxy - 11β - trifluoracetoxy - 21 - acetoxy - 3:20-diketo-2:4-dibrom-allopregnane crystallizes out. It melts at 175–182° C.

The above starting material can be prepared, for example, as follows:

40.6 grams of 11β:17α-dihydroxy-21-acetoxy-3:20-diketo-allopregnane are dissolved in 200 cc. of tetrahydrofurane and 200 cc. of pyridine, and mixed at 0° C., while continuously stirring, dropwise with 45 grams of trifluoracetic anhydride dissolved in 45 cc. of pyridine. After stirring for a further 15 hours at 10–25° C., the reaction mixture is concentrated in vacuo and the residue is taken up in ether and ice water. The ethereal extract is washed in turn with ice-cold 0.1 N-hydrochloric acid and sodium bicarbonate solution of 2.5 percent strength, then dried and concentrated. By the addition of 150 cc. of methanol the 11β:17α-bis-trifluoracetoxy-21-acetoxy-3:20-diketo-allopregnane crystallizes out of the concentrate.

Example 5

8 grams of 17α-trifluoracetoxy-3:11:20-triketo-21-acetoxy-allopregnane are dissolved in 100 cc. of chloroform (free of alcohol), a few drops of a chloroform solution saturated with hydrogen bromide are added, and then a solution of 5.62 grams of bromine in 200 cc. of chloroform are allowed to drop in in the course of 15 minutes while stirring. After 1 hour the chloroform solution is diluted with ether, washed with water, and dried, and the solvents are evaporated under reduced pressure at 40° C. The 17α-trifluoracetoxy-2:4-dibromo-3:11:20-triketo-21-acetoxy-allopregnane remaining behind is dissolved in 500 cc. of acetone, the solution mixed with 40 grams of sodium iodide, refluxed for 15 hours, and evaporated in vacuo. The residue is dissolved in a 3:1 mixture of ether and chloroform. The ether-chloroform solution is washed with sodium thiosulfate solution and water, dried and evaporated. The crystalline Δ⁴-2-iodo-3-keto-compound, which decomposes in the heat, is dissolved in 300 cc. of ethanol and, after the addition of 50 grams of zinc dust, boiled under reflux for 2 hours. The zinc is then removed by suction filtering, the reaction mass washed with ethanol, and the ethanol solution evaporated under reduced pressure. Dilute hydrochloric acid is added to the residue, which is then dissolved in a 3:1 mixture of ether and chloroform. The ether-chloroform solution is washed with water, dried and evaporated. For acetylation, the crystalline residue is then allowed to stand in 20 cc. of pyridine and 40 cc. of acetic anhydride for 15 hours. After the addition of water, the solution is evaporated in vacuo, the residue taken up in a mixture of ether and chloroform (3:1), the ether-chloroform solution washed with dilute hydrochloric acid and water, dried and evaporated. The residue is recrystallized from a mixture of acetone and ether and pure cortisone-21-acetate of melting point 236–242° C. obtained which according to the paper chromatogram is unitary.

The starting material used in this example can be obtained as follows:

5 grams of 17α-hydroxy-21-acetoxy-3:11:20-triketo-allopregnane are mixed with 50 cc. of dioxane, 4 cc. of trifluoracetic anhydride and 2 cc. of pyridine, the suspension passing into solution on shaking for about 10 minutes. The solution is allowed to stand for 1 hour and then evaporated under reduced pressure at 60° C. The residue is taken up in either, immediately washed with dilute ice-cold hydrochloric acid and ice water, dried and concentrated by evaporation, the 17α-trifluoracetoxy-21 - acetoxy-3:11:20 - triketo-allopregnane crystallizing. After recrystallization from mixtures of acetone and isopropyl ether the compound melts at 179–182° C.

Example 6

16.0 grams of bromine are dissolved in 300 cc. of dimethyl formamide and introduced with stirring at room temperature into a solution of 50.0 grams of 17α-trifluoracetoxy - 21-acetoxy - 3:20 - diketo - 9α - fluoro - 11β - hydroxy-allopregnane and 40 grams of para-toluene sulfonic acid in 500 cc. of dimethyl formamide. When all the bromine has been consumed, another 16.0 grams of bromine diluted with 300 cc. of dimethyl formamide are added dropwise in the course of 2–4 hours at room temperature. 15 cc. of water are then added, and the reaction mixture is allowed to stand for 24 hours at room temperature. By the further addition of water 17α-hydroxy-21 - acetoxy - 3:20 - diketo - 9α - fluoro - 11β - hydroxy-2:4-dibromo-allopregnane is precipitated. The reaction product is filtered with suction, washed with water and dried.

65.8 grams of 17α-hydroxy-21-acetoxy-3:20-diketo-9α-fluoro-11β-hydroxy-2:4-dibromo-allopregnane are heated together with 1000 cc. of 2:4:6-trimethyl-pyridine for several hours. The reaction mixture is then concentrated in vacuo and the residue extracted with ethyl acetate. The ethyl acetate extract is washed with dilute hydrochloric acid and dilute sodium bicarbonate solution, dried and evaporated under reduced pressure, and a mixture of ether and acetone is added, whereupon Δ¹:⁴-17α-hydroxy-21 - acetoxy - 3:20 - diketo - 9α - fluoro - 11β - hydroxy-pregnadiene crystallizes out. Melting point: 237° C.; λ max. 240 mμ, ε=14800.

If 17α - trifluoracetoxy - 21 - acetoxy - 3:20 - diketo-9α-chloro-11β-hydroxy-allopregnane is used as starting material there is obtained in an analogous manner by bromination, hydrolysis of the trifluoracetyl residue in 17-position, and splitting off hydrogen bromide, Δ¹:⁴-17α hydroxy - 21 - acetoxy - 3:20 - diketo - 9α - chloro - 11β-hydroxy-pregnadiene.

The above starting material can be prepared as follows:

40.4 grams of 17α-hydroxy-21-acetoxy-3:20-diketo-9α-fluoro- or 19α-chloro-11β-hydroxy-allopregnane are dissolved in 250 cc. of pyridine and mixed dropwise at 0° C. with stirring with 45 grams of trifluoracetic acid anhydride diluted with 45 cc. of dioxane. The reaction mixture is stirred for 10–12 hours at 15–25° C. The mixture is concentrated in vacuo and the residue is then dissolved in ether and washed in succession with ice water, ice-cooled 0.1 N-hydrochloric acid, ice-cooled 2.5% sodium bicarbonate solution and ice water, then dried, concentrated and the residue mixed with methanol, whereupon 17α-trifluoracetoxy - 21 - acetoxy - 3:20 - diketo - 9β - fluoro - 11β-hydroxy-allopregnane crystallizes out.

What is claimed is:

1. A process which comprises the step of treating a member selected from the group consisting of a 3:20-diketo-pregnane containing in the 21-position a member selected from the group consisting of hydroxy, lower alkyl-carbonyloxy- and trifluoro-lower alkyl-carbonyloxy radicals, in the 17-position a trifluoro-lower alkyl-carbonyloxy radical, in the 11-position a member selected from the group consisting of hydroxy, oxo and trifluoro-lower alkyl-carbonyloxy radicals, and the corresponding 3-keto-2-halogen derivatives thereof with a halogenating agent.

2. A process as set forth in claim 1 wherein the halogenation is carried out with bromine.

3. A process as set forth in claim 1 wherein the halogenation is carried out in the presence of a catalyst at a temperature of from about −50° C. to about 50° C.

4. A process as set forth in claim 1 wherein the starting material has, in addition, a halogen atom in the 9α-position.

5. A process as set forth in claim 1 wherein the starting material is 17α-trifluoracetoxy-21-acetoxy-3:20-diketo-9α-fluor-11β-hydroxy-allopregnane.

6. A process as set forth in claim 1 wherein the starting material is 17α:21-bis-trifluoracetoxy-3,11,20-triketo-allopregnane.

7. A process as set forth in claim 1 wherein the starting material is 17α-trifluoracetoxy-21-acetoxy-3,11,20-triketo-allopregnane.

8. A process as set forth in claim 1 wherein the starting material is 11β:17α:21-tris-trifluoracetoxy-3,20-diketo-allopregnane.

9. 17α - trifluoracetoxy - 2:4 - dibromo - 3,11,20 - triketo-21-acetoxy-allopregnane.

10. 17α:21 - bis - trifluoracetoxy - 2:4 - dibromo - 3,11,20-triketo-allopregnane.

11. 11β:17α:21 - tris - trifluoracetoxy - 2:4 - dibromo-3:20-diketo-allopregnane.

12. 17α - trifluoroacetoxy - 2:4 - dibromo - 3:20 - diketo-11β-hydroxy-9α-fluoro-allopregnane.

13. 17α - trifluoracetoxy - 2:4 - dibromo - 3:20 - diketo-11β-hydroxy-9α-chloro-allopregnane.

14. A compound of the formula:

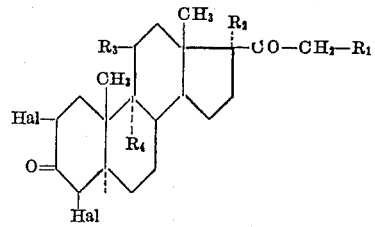

wherein $R_1$ is a member selected from the group consisting of hydroxy, lower alkyl-carbonyloxy and trifluoro-lower alkyl-carbonyloxy radicals, $R_2$ is a trifluoro-lower alkyl-carbonyloxy radical, $R_3$ is a member selected from the group consisting of hydroxy, oxo and trifluoro-lower alkyl-carbonyloxy radicals and $R_4$ is a member selected from the group consisting of hydrogen and halogen, and Hal is a halogen substituent.

References Cited in the file of this patent
UNITED STATES PATENTS

| | | |
|---|---|---|
| 2,703,805 | Rosenkranz | Mar. 8, 1955 |
| 2,735,855 | Djrassi | Feb. 21, 1956 |
| 2,736,734 | Sarett | Feb. 28, 1956 |

FOREIGN PATENTS

| | | |
|---|---|---|
| 1,107,486 | France | Aug. 10, 1955 |

OTHER REFERENCES

Fried: Jour. Am. Chem. Soc., 75, 2273 (1953), 76, 1455–6 (1954).

UNITED STATES PATENT OFFICE
Certificate of Correction

Patent No. 2,854,465                                September 30, 1958

Albert Wettstein et al.

It is hereby certified that error appears in the printed specification of the above numbered patent requiring correction and that the said Letters Patent should read as corrected below.

Column 6, line 59, for "19α-chloro-" read -9α-chloro-.

Signed and sealed this 30th day of December 1958.

[SEAL]

Attest:
KARL H. AXLINE,
*Attesting Officer.*

ROBERT C. WATSON,
*Commissioner of Patents.*